United States Patent [19]

Moore

[11] 4,273,539
[45] Jun. 16, 1981

[54] SHOE-TYING TRAINING TOY

[76] Inventor: Glenn T. Moore, 1742 Terpsichore St., New Orleans, La. 70113

[21] Appl. No.: 96,688

[22] Filed: Nov. 23, 1979

[51] Int. Cl.$^3$ ............................................. G09B 19/00
[52] U.S. Cl. ..................................................... 434/260
[58] Field of Search ......................... 35/1, 8 R, 15, 57; 273/1.5 A, 354

[56] References Cited

U.S. PATENT DOCUMENTS

| | | | |
|---|---|---|---|
| 2,180,653 | 11/1939 | Yancey | 35/8 R |
| 2,490,342 | 12/1949 | Essington | 35/8 R |
| 3,546,789 | 12/1970 | Kushell | 35/8 R |
| 3,612,528 | 10/1971 | Glass | 273/354 |
| 3,638,334 | 2/1972 | Malikowski | 35/8 R |

OTHER PUBLICATIONS

Rim-Within-A-Rim for Basketball, Washington Daily News, Nov. 28, 1969, p. 80 only.

Primary Examiner—Harland S. Skogquist
Attorney, Agent, or Firm—C. Emmett Pugh & Associates, Patent & Trademark Attorneys, Ltd.

[57] ABSTRACT

A training toy for helping children learn how to lace their shoes and also to enhance or improve their fine motor skill (eye/hand coordination). The shoe-configured toy includes a series of adjustable diameter eyelets disposed upon the forward slope of the toy and an open or hollowed out central area for storage and ease in use. The toy is mounted on wheels, and the training shoe string can also be used to pull the toy about on its wheels. The diameter adjustment system for the eyelets includes a set of longitudinally slidable plates with different diameter eyelet openings which can be moved into the eyelet areas to alter the effective diameter of the eyelets. An alternate system (FIG. 5) includes a coiled spring element whose outer end is moved in and out to change its effective diameter.

9 Claims, 5 Drawing Figures

SHOE-TYING TRAINING TOY

BACKGROUND OF THE INVENTION

1. Field of the Invention

The present invention relates to a training toy. More particularly, the present invention relates to a training toy which has the general configuration of a shoe and presents a series of pairs of adjustable diameter eyelets for assisting a child in learning the task of lacing and tying shoes and also generally to enhance his motor skills, particularly his eye/hand coordination.

2. General Background and Prior Art

Children at a very early age are dependent upon their parents and adults in general to assist them with manual tasks which require a certain degree of dexterity, which is lacking in most children during the early years. One of the tasks, which all children and parents must face, is the task of lacing and tying of shoes, a daily chore which, when continued to go unlearned by a child, is a severe burden and frustration for the child, and an inconvenience for the parents during the course of each day. Thus, it is desirable that a child be exposed to the manipulation steps involved in lacing and tying shoes at the earliest age possible.

The present invention presents the child with a learning device conceived as a toy, so that the child welcomes the contact with the toy device from day to day and, through this day-to-day manipulation and contact with the toy, is exposed to the steps in learning to lace and tie shoes.

3. General Discussion of the Present Invention

The present invention utilizes the features of a generally shoetype configured toy wherein a series of opposed pairs of adjustable diameter eyelets running along the top surface of the toy would resemble closely the eyelets of a shoe. Also, the top surface of the toy is angled in such a way so as to resemble the downward slant of a shoe as it conforms to the shape of the foot. The shoe-type toy preferably is set on four wheels with a string located in the front for easy maneuverability of the toy from one room to the next as a child moves about.

The toy preferably includes a hollowed out or open storage and play center so that the child, upon passing the end of a string through an outlet along the top of the toy, can easily reach in beneath the eyelet, as one would do in lacing a shoe. This process would be, as with a shoe, started at the base of the shoetype toy, and continued with the upward and downward lacing through the series of eyelets until the criss-cross effect is achieved through the last series of eyelets, whereupon the child then practices the task of tying the laces into a bow as he would his own shoe. This is, of course, the ultimate goal of the invention, which is realized after the child is exposed to the toy of the invention and has achieved the simple task of threading the eyelets.

To further adapt the invention to the child's progress as he develops increased eye/hand coordination, the invention in its preferred embodiment is equipped with a series of slidable plates having different diameter openings, which, when aligned with the static maximum opening eyelets cause them to effectively become increasingly smaller in circumference. This variability of the eyelet diameters, enabling the eyelets to effectively constrict and expand, enables the older, better coordinated child to obtain a greater degree skill in threading the smaller eyelets, hopefully eventually to the point that the eyelet size is that of an actual shoe, and the child then would be able to thread the eyelets on an actual shoe without any difficulty.

Thus, from the shoetype toy of the invention the child could easily move into the lacing and tying of his own shoes, having achieved the necessary skills after exposure to the toy of the present invention.

The present invention thus provides a child's training toy, wherein an elongated body, in the shape of a shoetype configuration, has the slope of the top surface from the back to the front of the toy forming an angle of the order of for example thirty degrees with the bottom surface. The shoetype toy is preferably hollowed out or beneath the top surface, for reasons explained further. Along the top surface is situated a series of pairs of eyelets, resembling the eyelets of a shoe, but significantly larger in diameter in their maximum adjustment disposition. An appropriate mechanical diameter adjustment system or means is provided for decreasing the circumferential area or diameter of the shoe eyelets. Contrarily, movement of the adjustment system in the opposite direction causes the diameters of the eyelets to increase.

This making of the diameter of the eyelets adjustable is desirable so that a younger child could thread the eyelets at their maximum expanse, and, as the child was able to become more adept at threading the eyelets, decreasing their size until they closely resembled or simulated the size of the eyelets of an actual shoe.

As noted, the entire toy rides preferably on a set of back wheels and front wheels, with a string attachment located at the front end so that the child can pull the toy around from room to room, thus increasing his exposure to it during the course of the day.

It is thus an object of the present invention to provide a training toy to help in the training of children in the task of lacing and tying their shoes, which is a very complicated task for a small child.

It is also an object of this invention to better a child's fine coordination skills which often play an important role in how well the child will do in school, as has been stated by a number of child psychologists.

Another object of this invention is to have the parents actually help with this learning process, which itself will help the child and the parent to have a good relationship, and this also helps the child generally in his school work. As stated by child psychologists, children who get more attention from their parents during their early, formative stages of development are better adjusted when they mature, and also seem to do better in their school settings.

With the above and other objects in mind, which will appear as the description proceeds, the present invention resides in the novel construction, combination and arrangement of parts substantially as hereinafter described and defined by the claims, it being understood that this showing and description are to be taken in an illustrative sense only.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
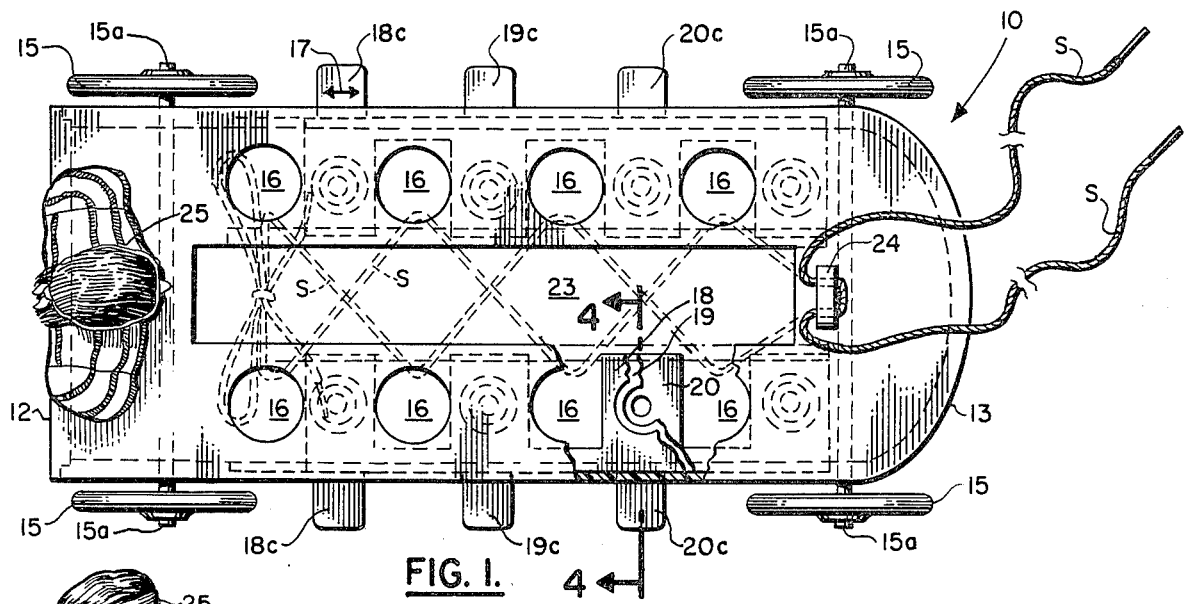
FIG. 1 is a plan view of the preferred embodiment of the training toy of the present invention, partially cut-away in certain limited areas to show the internal assembly across the front of the toy with its different diameter subsurface plates for adjustment of the diameters of the eyelets disposed down across the top surface of the toy.
Figure 2:
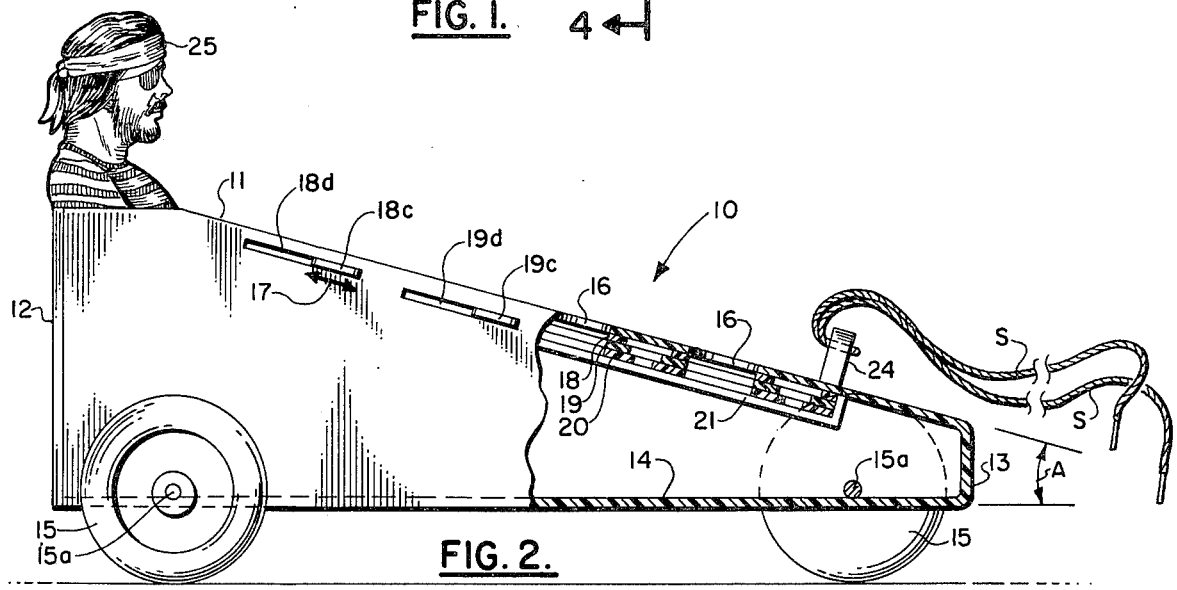
FIG. 2 is a side view of the preferred embodiment of the training toy of the present invention illustrating the downwardly sloped top surface, with the side wall partially cut-away to show the assembly of the different diameter, longitudinally slidable plates involved in adjusting the effective diameter of the eyelets.

FIGS. 1-4 illustrate the preferred embodiment of the child's training toy of the present invention, comprised generally of an elongated body 10 which has a sloping top surface 11 which slopes down from a back side 12 to a front edge tip 13 at an angle "A" (note FIG. 2) of the order of for example thirty degrees in relation to the bottom 14. The elongated body 10 generally resembles the shape or configuration of a shoe, having the sloping top and a length at least two times greater than its width, and is preferably carried by two sets of wheels 15, each set at the end of an axle 15a across the bottom side 14 of the toy.

As can best be seen in FIG. 1, the top surface 11 is equipped with a series of open, circular eyelets 16, laid out across the top surface 11 in opposed pairs.

FIG. 1 illustrates a top view of the preferred embodiment of the training toy of the present invention, further illustrating the position of the sets of front and rear wheels 15 upon which the training toy 10 would roll via axles 15a when pulled by a string "S" attached to the front pull attachment eyelet 24. Further illustrated in FIG. 1, as noted, are the series of pairs of eyelets 16 across the top surface of the elongated body 10 through which a child would lace the string "S" through the series of eyelets 16 (not phantom lined "S") in such a manner to resemble the lacing of a shoe.

Space 23 illustrates the hollow or open cavity within the elongated body 10 in which the child maneuver his fingers to retrieve the string as it is unlaced down through the eyelets 16, and so that he may lace it back up through the eyelets 16, and so forth, until the elongated body 10 would resemble a laced shoe. The cavity 23 can also be used as a "treasure chest" for storage of other small toys or items during the toy's use as a play item.

The eyelets 16, what is shown in FIG. 1 as "open" to its maximum effective diameter, includes a diameter varying or adjustment system comprising a set of longitudinally slidable (note direction arrow 17) plates 18, 19 and 20, which can be moved up into position within the opening 16 to lessen the effective diameter of the eyelet opening (note FIG. 4) under the action of lateral tabs 18c, 19c and 20c, respectively, which ride in slots 18d, 19d and 20d respectively.

Figure 3:
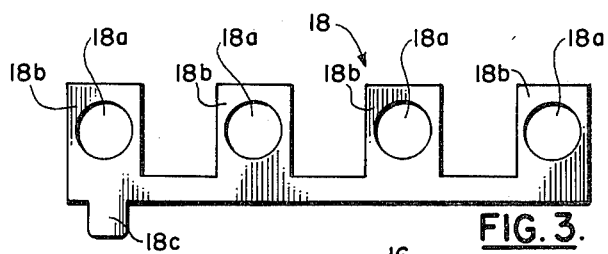
FIG. 3 is a plan view of one of the diameter varying slidable plates.

A typical one 18 of the slidable plates 18-20 is shown in FIG. 3. Each plate, for example plate 18, includes a series of rectangular sections 18b (equal in number to the number of eyelets on each side) having eyelet openings 18a in them, with the tab 18c used to move it longitudinally up and down along the sloping top surface 11 of the toy 10. The diameters of the holes 16, 18a, 19a and 20a can be for example 1", ¾", ½" and ¼" respectively.

Figure 4:
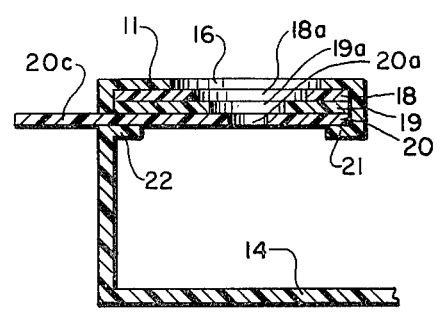
FIG. 4 is a partial, crosssectional view taken along section lines 4—4 of the embodiment of FIG. 1 but with the slidable plates positioned within the eyelet opening.

When it is desired to increase the skill level of the toy 10 for threading the eyelets, from the maximum open disposition shown in FIG. 1, the plate 18 can be moved up by means of tab 18c so that the opening 18a aligns center-to-center with the opening 16, effectively reducing the diameter of the eyelets from for example 1"down to ¾". Likewise, for further increases in skill levels and correspondingly decreasing eyelets diameters, the plates 19 and then 20 can be moved up into position (as shown in FIG. 4) decreasing the effective diameter of the eyelets ultimately down to for example ¼". As can be best seen in FIG. 4, the plates 18-20 ride in and are supported by channels 21 and 22. Thereafter, of course, one or more of the plates 18-20 could be moved down out of the effective eyelet opening 16 to increase the effective opening, as desired.

Detents (not illustrated) or other temporary position holding means could be provided if desired to positively retain the plates 18-20 in their upward dispositions, until moved back down under some externally imposed force. Also the "left" and "right" sets of plates 18-20 on each side could be interconnected, for example at their front, lower most edges so that each like set would move together.

Additionally, for example, vertically extending tabs or pins could be provided on the plates 18-20 so that as a selected plate was moved out of the eyelet region 16, any and all smaller diameter plates would also be moved out, and conversely, when a selected plate was moved into the eyelet region 16, any and all greater diameter plates would also be moved in.

It is noted that, having the relative size openings disposed with the largest one on top, as shown in FIG. 4, helps guide the shoe string tip into and through the eyelets. However, such aiding bias can be eliminated if desired by reversing the sequence and having the largest, static opening 16 at the bottom, with the smaller openings to be moved in over it in sequence.

Figure 5:
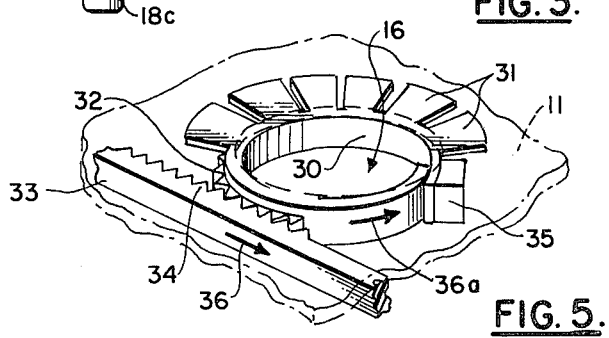
FIG. 5 is a partial, perspective view of an alternate embodiment of the diameter adjustment system for the variable diameter eyelets of the toy of the present invention.

An alternate embodiment of eyelet diameter varying or adjustment system is illustrated in FIG. 5. In this embodiment each eyelet 16 is formed of a circular, resilient coil 30 with a nested, moveable end and a fixed end 35 anchored to the body 10 of the top, for example to the top 11. The outer surface of the coil 30 carries a set of gear teeth 32 which mesh with a rack gear 34 on a longitudinally moveable member or adjustment rod 33 which is moveable relative to the body 10.

When the adjustment rod 33 is moved in the direction of arrow 36, the moveable end of the coil 30 advances in the direction of arrow 36a, causing by the increased coiling the effective diameter of the eyelet 16 to be decreased in a continuous manner (in comparison to the stepped, regimented changes of diameter in the embodiment of FIGS. 1-4). Filler tabs 31 are disposed along the upper sides of the coil 30 to fill in the otherwise open area that would have been produced as the coil 30 decreased from its maximum diameter. Of course, when the rod 33 is moved in the reverse direction, the effective eyelet diameter is increased.

Of course, many other mechanical systems for varying the diameter of the eyelets are possible, such as, for further examples–a series of overlapping tabs or plates similar to that found in the aperture varying systems for cameras; which however would be relatively extensive and complex, and a pair of opposed plates having "V" shaped overlapping openings toward each other, which plates can be moved toward or away from each other varying the size of the combined opening formed between them (which however would not produce an opening in the form of a circle).

To make the training toy 10 more appealing, various configurations or decorative schemes or themes can be used, such as for example the pirate's head 25 as illustrated, for a "treasure chest" theme. A further example would be "the little old lady who lived in a shoe" motif.

The toy can have a rigid body made of for example plastic, as shown, or can be made of cloth, leather, vinyl, or other feasible material to more realistically portray an actual shoe. Also, although circular eyelets are preferred, the eyelet openings can be made in the form of other shapes or configurations for example a square opening.

FIG. 3 illustrates a top view of the preferred embodiment of the training toy of the present invention, further illustrating the position of the set of front wheels 15 upon which the training toy 10 would roll via axles 21 when pulled by a string "S"—attached to the front pull eyelet 22. Further illustrated in FIG. 3 are the series of pairs of eyelets 16 across the top surface of the elongated body 10 wherein a child would lace the string "S" through the series of eyelets 16 in such a manner to resemble the lacing of a shoe.

The preferred embodiment of the training toy 10 of the present invention as illustrated in FIGS. 1–4 could have the following exemplary dimensions:

| | |
|---|---|
| Length of elongated body 10 | 11" |
| Width of elongated body 10 | 4" |
| Height of back side 12 | 4" |
| Height of front side tip 13 | ½" |
| Diameter of eyelets 16 | 1" |
| (at greatest diameter) | |
| (at smallest diameter) | ¼" |
| Angle "A" of slope of top surface 11 | 32° |
| Diameter of wheels 15 | 2¼" |
| String length "S" for lacing through eyelets | 54" |
| Diameter of wheels | 2¼" |

Because many varying and different embodiments may be made within the scope of the inventive concept herein taught, and because many modifications may be made in the embodiments herein detailed in accordance with the description requirements of the law, it is to be understood that the details herein are to be interpreted as illustrative and not in a limiting sense.

What is claimed as invention is:

1. A child's training toy for training a child how to lace shoes and the like, comprising:
    a body having a extended exposed area on its top side;
    a series of pairs of opposed, open eyelets disposed on said body down along said open area, said eyelets being formed of movable members whose movements change the crosssectional areas of the openings of said eyelets to vary the skill level necessary for the child to thread a string through said eyelets; and
    opening adjustment means carried by said body and connected to said movable members for increasing and decreasing the effective opening areas of said eyelets, the opening area of each of said eyelets being openable to a maximum opening for beginning the training and then closeable ultimately to a significantly smaller size equivalent to the opening area of the standard eyelet on a real child's shoe.

2. The toy of claim 1 wherein said body includes an extended bottom, and wherein there is further included a set of supporting wheels at said bottom for wheeled movement of the toy about the supporting surface.

3. The toy of claim 1 wherein said extended area is sloped downwardly to form a slopped body.

4. The toy of claim 3 wherein there is included at the lower tip of said sloped body a shoe string retaining means for fastening a shoe string type line to said body alternately for lacing through said eyelets and for pulling said body on said wheels about the supporting surface.

5. The toy of claim 3 wherein said body generally has the configuration of a shoe, having a width comparable to a child's shoe and a length at least two times greater than said width.

6. The toy of claim 1 wherein said body includes string attachment means located adjacent to an end set of eyelets for attaching a string to said body for lacing through said eyelets during training and for pulling said body around during play.

7. The toy of claim 1 wherein each of said eyelets forms a circular opening and said adjustment means varies the diameters of said eyelets.

8. The toy of claim 7 wherein the diameter of each of said eyelets is variable from a minimum diameter of the order of a quarter inch to a maximum diameter of the order of an inch.

9. The toy of claim 5 wherein the width of said toy is of the order of four inches, the length of said toy is of the order of eleven inches, and the angle of the downward slope of the top surface is of the order of thirty degrees in relationship to the bottom surface of the toy.

* * * * *